(12) United States Patent
Yamasaki

(10) Patent No.: US 8,093,888 B2
(45) Date of Patent: Jan. 10, 2012

(54) HEAD ASSEMBLY DRIVE MECHANISM, HEAD HOLDER, MAGNETIC HEAD TESTER AND MAGNETIC DISK TESTER

(75) Inventor: Fujio Yamasaki, Kanagawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1298 days.

(21) Appl. No.: 11/682,012

(22) Filed: Mar. 5, 2007

(65) Prior Publication Data
US 2007/0205763 A1 Sep. 6, 2007

(30) Foreign Application Priority Data
Mar. 6, 2006 (JP) ................................. 2006-059436

(51) Int. Cl.
*G01R 33/12* (2006.01)
*G01N 17/00* (2006.01)
(52) U.S. Cl. ........................................ 324/212; 73/865.6
(58) Field of Classification Search .................. None
See application file for complete search history.

(56) References Cited

U.S. PATENT DOCUMENTS

| 5,491,413 | A | * | 2/1996 | Guzik | 324/212 |
| 5,998,994 | A | * | 12/1999 | Mori | 324/212 |
| 6,006,614 | A | * | 12/1999 | Guzik et al. | 73/865.6 |
| 6,538,838 | B1 | * | 3/2003 | Sacks et al. | 360/77.01 |
| 6,930,850 | B2 | * | 8/2005 | Takagi et al. | 360/77.03 |
| 7,035,039 | B2 | | 4/2006 | Shitara et al. | |
| 7,529,635 | B2 | * | 5/2009 | Anderson et al. | 702/108 |
| 7,768,737 | B2 | * | 8/2010 | Sakurai et al. | 360/75 |

FOREIGN PATENT DOCUMENTS
JP 2003-272326 9/2003
* cited by examiner

*Primary Examiner* — K. Wong
(74) *Attorney, Agent, or Firm* — Mattingly & Malur, PC

(57) ABSTRACT

A head holder includes a first and second blocks connected each other with a predetermined gap between the blocks by a flexible coupling portion. The second block supports the first block swingably by increasing a width of either one of spaces of the predetermined gap on opposite sides of the coupling portion and narrowing the other space by bending the coupling portion by a piezo actuator. A magnetic head is dynamically moved in a direction crossing a track by swinging a head assembly fixed to the first block.

17 Claims, 3 Drawing Sheets

HEAD ASSEMBLY DRIVE MECHANISM, HEAD HOLDER, MAGNETIC HEAD TESTER AND MAGNETIC DISK TESTER

TECHNICAL FIELD

The present invention relates to a head assembly drive mechanism, a head holder, a magnetic head tester and a magnetic disk tester and, particularly, in a magnetic head tester or a magnetic disk tester for controlling a magnetic head to an ON track state according to a servo signal set correspondingly tracks on a magnetic disk, the present invention relates to a head assembly drive mechanism, in order to move the magnetic head in a direction traversing the tracks, a head assembly, which is constituted with a suspension spring and a magnetic head member and supports the magnetic head through the suspension spring, is dynamically swung by utilizing elastic bending of the magnetic head member to reduce a mass of a movable portion of the head assembly to thereby improve a response speed of the magnetic head in the ON track control.

BACKGROUND ART

Since the track width of a magnetic disk is decreased with increase of recording density in the magnetic disk device, a substantial further improvement of preciseness of a head positioning is required in a magnetic head tester or a magnetic disk tester. Further, the rotation number of a disk is increased from 5400 rpm to a range from 700 rpm to 15000 rpm, or more, recently.

U.S. Pat. No. 7,035,039 (corresponding to JP-2003-272326A of the present applicant) discloses a technique in which a piezo actuator is provided between a suspension spring and a head carriage and a head assembly is driven by the piezo actuator according to a servo signal.

In the invention disclosed in U.S. Pat. No. 7,035,039, deviation of the magnetic head (referred to as "head", hereinafter) positioned in a predetermined track from a center of the track is corrected by finely moving a light weight head cartridge, which supports a head assembly, according to a servo signal or dynamically moving (rotating) the head assembly within the head cartridge according to the servo signal. The fine movement is achieved by moving the head, for example, several microns at high speed with respect to a track, so that positional correction of the head is performed highly precisely at high speed according to the servo signal in such a way that the head becomes an ON track state on the track or a predetermined position of the track.

In one of the embodiments of U.S. Pat. No. 7,035,039, the ON track positioning of the head is performed by finely moving the head cartridge mounted on a piezo stage for finely adjusting a position of the head and then dynamically rotating the head assembly provided in the head cartridge to the ON track state according to the servo signal.

This head assembly is axially supported by a cylindrical member and swung around an axis of the cylindrical member by the piezo actuator. Since the piezo actuator finely moves the head in such a way that deviation of the head from the track center is corrected, a swinging mechanism of the head assembly makes the head possible to respond to the servo signal at high speed.

However, since the number of tracks per inch is increased to several thousands recently, higher preciseness of servo control and higher speed movement of the head of the rotation mechanism of the head assembly are required. However, since a mass of a rotary portion of the previously described system in which the head assembly is swung around the cylindrical member is large, it is necessary to rotate a disk by one or more until the position of the head is corrected to an ON track state. Therefore, there is a problem that read/write of a test data takes time. Consequently, it is necessary to further improve the response speed of the head in the ON track control.

SUMMARY OF THE INVENTION

An object of this invention is to provide a head assembly drive mechanism or a head holder, which is capable of driving a head assembly at high speed by reducing mass of a movable portion by swinging a head assembly in such a way that a head moves across a track to thereby improve the response speed of the head in the ON track control.

Another object of the present invention is to provide a magnetic head tester and a magnetic disk tester, which are capable of dynamically positioning a head in a track or a predetermined position of the track highly precisely at higher speed.

In a head assembly drive mechanism or a head holder of the present invention which achieves the above objects, a head holder for holding a head assembly is constructed with a first block to which the head assembly is fixed, a second block, a flexible coupling portion for coupling the first block to the second block with a predetermined gap between the first and second blocks and an actuator fixed to the first block or the second block. The head assembly drive mechanism swings the head assembly in such a way that the magnetic head is moved in a direction crossing a track by bending the coupling portion to change width of either one of spaces on both sides of the coupling portion in a predetermined gap.

A magnetic head tester or a magnetic disk tester of the present invention is characterized in that it tests the magnetic head or the magnetic disk by controlling the head in such a way that the magnetic head becomes in an ON state on a track by providing the head assembly drive mechanism or the head holder. In the present invention, the head holder is divided to two blocks, a first block and a second block, through a flexible coupling portion. The first and second blocks are connected with a predetermined gap between them.

When width of either one of spaces on the opposite sides of the coupling portion is widened, the other space is narrowed by bending of the coupling portion. On the contrary, when width of the other space is widened, the one space is narrowed by bending of the coupling portion. The coupling portion may be formed as a linear elastic member and, when the coupling portion is bent, the first block supported by the coupling portion is swung correspondingly to an amount of bending of the coupling portion with respect to the second block. In other words, the second block supports the first block swingably by the coupling portion. With such construction, it is possible to move the head in the direction crossing a track by swinging the head assembly by merely fixing the head assembly to the first block without supporting the head assembly by a special rotary mechanism for rotatably supporting the head assembly.

Since, when the number of tracks becomes several thousands per inch or more, the dynamic swing angle of the head assembly become as small as 1° or less, for example, about 0.1° to 0.3°.

In the present invention, the head assembly is swung by changing the width of either one of the spaces on the both sides of the coupling portion by the actuator. The block to be swung is only the first block and, since the first block is to merely fix the head assembly, it is possible to reduce the mass thereof. Therefore, the mass of the swinging portion corresponding to the conventional rotary portion can be reduced.

Incidentally, though the mass of the first block can be reduced when the actuator is provided on the side of the second block, the actuator may be provided on the side of the first block when the mass of the actuator is small.

As a result, according to the present invention which provides the swing mechanism utilizing elasticity of the member as the movable portion of the head assembly, it is possible to reduce the mass of the swing mechanism to thereby drive the head assembly at high speed and improve the response speed of the head in the ON track control. In the magnetic heads tester and the magnetic disk tester using the head assembly drive mechanism or the head holder, it is possible to dynamically position the head on substantially a center or a predetermined position of an aimed track precisely at high speed.

DESCRIPTION OF THE PREFERRED EMBODIMENTS

Figure 1:
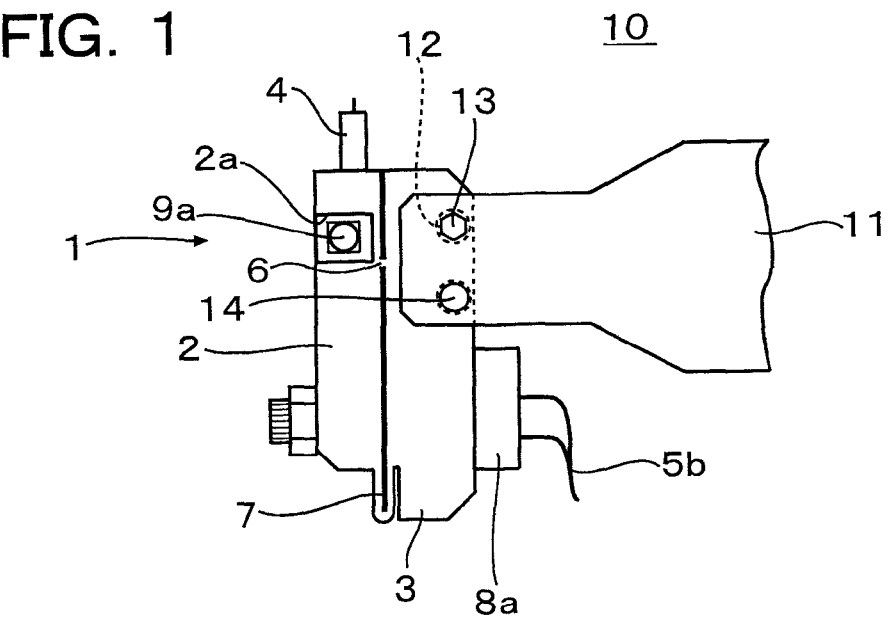
FIG. 1 is a plan view of a head holder having a head assembly drive mechanism according an embodiment of the present invention.

In FIGS. 1 to 4, a reference numeral 10 depicts a head assembly drive mechanism and 1 depicts a head holder in which the head assembly drive mechanism 10 is provided.

The head holder 1 is constructed with a single rectangular stainless steel (SUS) member as a whole and is divided to two blocks connected together by a flexible coupling portion 6. One of the blocks is a rectangular head assembly fixing block (first block) 2 and the other block is a rectangular support block (second block) 3 supporting the head assembly fixing block 2.

Figure 2:
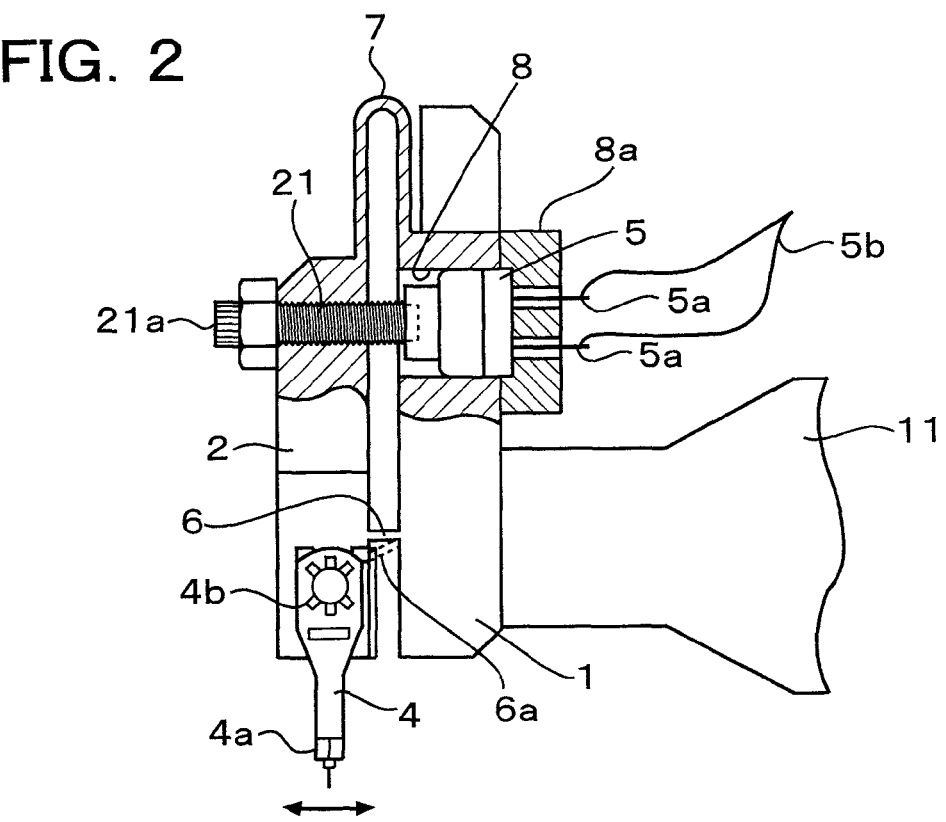
FIG. 2 is a plan view of a rear side of the head holder.
Figure 3:
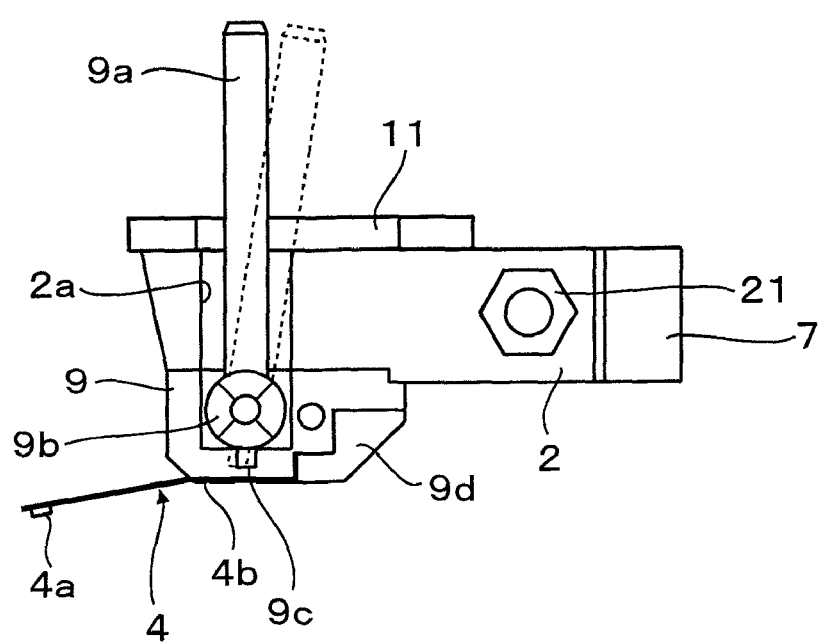
FIG. 3 is a side view of the head holder.

As shown in FIGS. 2 and 3, a head clamp mechanism 9 for detachably mounting a head assembly 4 is mounted on a lower surface of the head assembly fixing block 2 and the head assembly 4 is supported through the head clamp mechanism 9. A reference numeral 4a depicts a head and 4b a suspension spring.

As shown in FIG. 2, a piezo actuator 5 is fixedly provided within the support block 3, which is mounted on a head holder support arm 11.

The head assembly fixing block 2 and the support block 3 have substantially the same thickness and width. Portions in the vicinity of one end sides of the head assembly block 2 and the support block 3 are connected together with a predetermined gap in the order of 1 mm between them by the thin single linear flexible coupling portion 6 (the support portion of the head assembly fixing block 2) having width in the order of 1 mm in plan view and portion of the other end sides of the blocks 2 and 3 are connected by a folded connecting portion 7 (an auxiliary support portion of the head assembly fixing block 2) in such a way that the head assembly fixing block 2 can swing. The coupling portion 6 forms an elastic member.

Incidentally, in order to explain the swing of the head assembly fixing block 2, a gap between the coupling portion 6 and the connecting portion 7 is shown exaggeratedly in FIG. 2 to clarify the relation between the blocks. A double arrow shown in FIG. 2 is a swing angle range, which is about 0.1°, practically. The connecting portion 7 allows a minute swing of the coupling portion 6 due to a curving of the connecting portion 7. In a case where the swing angle is about 0.1°, the head provided in an end of the suspension spring can cross a track substantially linearly.

The coupling portion 6 and the connecting portion 7 may be formed by cutting out portions about 1 mm wide of the single rectangular block. By this cutting, the assembling fixing block 2 and the support block 3 connected in parallel by the coupling portion 6 and the connecting portion 7 are provided. Thicknesses (depths) of the coupling portion 6 and the connecting portion 7 are 10 mm respectively and are equal to the support block 3 as well as the head assembly fixing block 2 without the protruded portion of the head clamp mechanism 9. The thickness of the block of the head holder 1 in the state where the support block 3 supports the head assembly fixing block 2 is in a range from about 8 mm to about 12 mm and width of the coupling portion 6 is preferably selected in a range from 0.8 mm to 1.5 mm.

When the thickness of the head assembly fixing block 2 is 12 mm or larger, the width of the coupling portion 6 can be 0.8 mm or smaller due to elasticity of the coupling portion 6. In such case, the mass of the head assembly fixing block 2 becomes large. Although the mass of the head assembly fixing block 2 can be made smaller by setting the thickness of the head assembly fixing block 2 to 8 mm or less and setting the width of the coupling portion 6 to 1.5 mm or more. It is necessary to increase the power of the piezo actuator 5, since the coupling portion 2 is hardly bent. Therefore, the response speed control of the head is degraded.

Of course, it is possible to couple the head assembly fixing block 2 and the support block 3 through a leaf spring. In such case, it is possible to reduce the thickness of the coupling portion to 0.8 mm or smaller, for example, about 0.5 mm and the thickness of the head assembly fixing block 2 to 8 mm or less and it is preferable to couple the head assembly fixing block 2 and the support block 3 by a leaf spring. The blocks can be coupled together by providing coupling grooves in the respective blocks and inserting opposite ends of the leaf spring into the grooves. Since the material of the head holder 1 is different from that of the leaf spring, there is a problem that preciseness can not be kept due to deviation between the head assembly fixing block 2 and the leaf spring, which is caused by a change over the years.

Though, as mentioned previously, the gap and the bend portion between the blocks somewhat exaggerated for the explanation of the coupling portion 6 in FIG. 2, the lengths of the head assembly fixing block 2 and the support block 3 are about 30 mm, respectively, and the coupling portion 6 is provided in a position about 10 mm remote from the head side of the ends of the blocks, that is, ⅓ of the length of the blocks. When a screw 21 is pushed out by the piezo actuator 5, a width of a space in which the screw 21 exists is expanded and the coupling portion 6 is bent counterclockwise. Therefore, a width of the space on the head side end of the head assembly fixing block 2 is narrowed. Therefore, the head assembly fixing block 2 is swung in counterclockwise direction. On the contrary, when a screw 21 is pulled in, the width of the space in which the screw 21 exists is narrowed and the space on the head side end of the head assembly fixing block 2 is expanded by bending of the coupling portion 6 clockwise. Therefore, the head assembly fixing block 2 is swung in clockwise direction.

In such case, since the coupling portion 6 made of SUS is 1 mm wide in plan view, it bends according to elasticity thereof correspondingly to a movement of a vibrating surface of the piezo actuator 5 and supports the head assembly fixing block 2 in swing state with respect to the support block 3 with the coupling portion 6 as a reference. Considering the track width of the magnetic disk, the swing angle thereof may be enough to swing the head assembly fixing block by about 0.1°. Therefore, it is enough to provide the gap of either of the spaces on the both sides of the coupling portion between the head assembly fixing block 2 and the support block 3 which is about 1 mm as mentioned previously.

As shown in FIG. 2, the piezo actuator 5 is fixed in a hole 8 provided in a rear end side of the support block 3 opposite to the forward end side of the head assembly fixing block 2 on which the head assembly 4 is mounted with the coupling portion 6 between them. The piezo actuator 5 is fixed in the hole 8 through a fixing bracket 8a by such as adhesive.

The driving surface of the piezo actuator 5 is screwed to a leg portion of the screw 21 bolted into a position corresponding to the head assembly fixing block 2, so that the driving surface is united to the head assembly fixing block 2. The head assembly fixing block 2 and the screw 21 bolted therein are moved together forward and backward. The screw 21 has a knob 21a and through-holes through which terminals 5a of the piezo actuator 5 are derived are provided in the fixing bracket 8a. The terminals 5a receive the drive signal through lead lines 5b.

Figure 5:
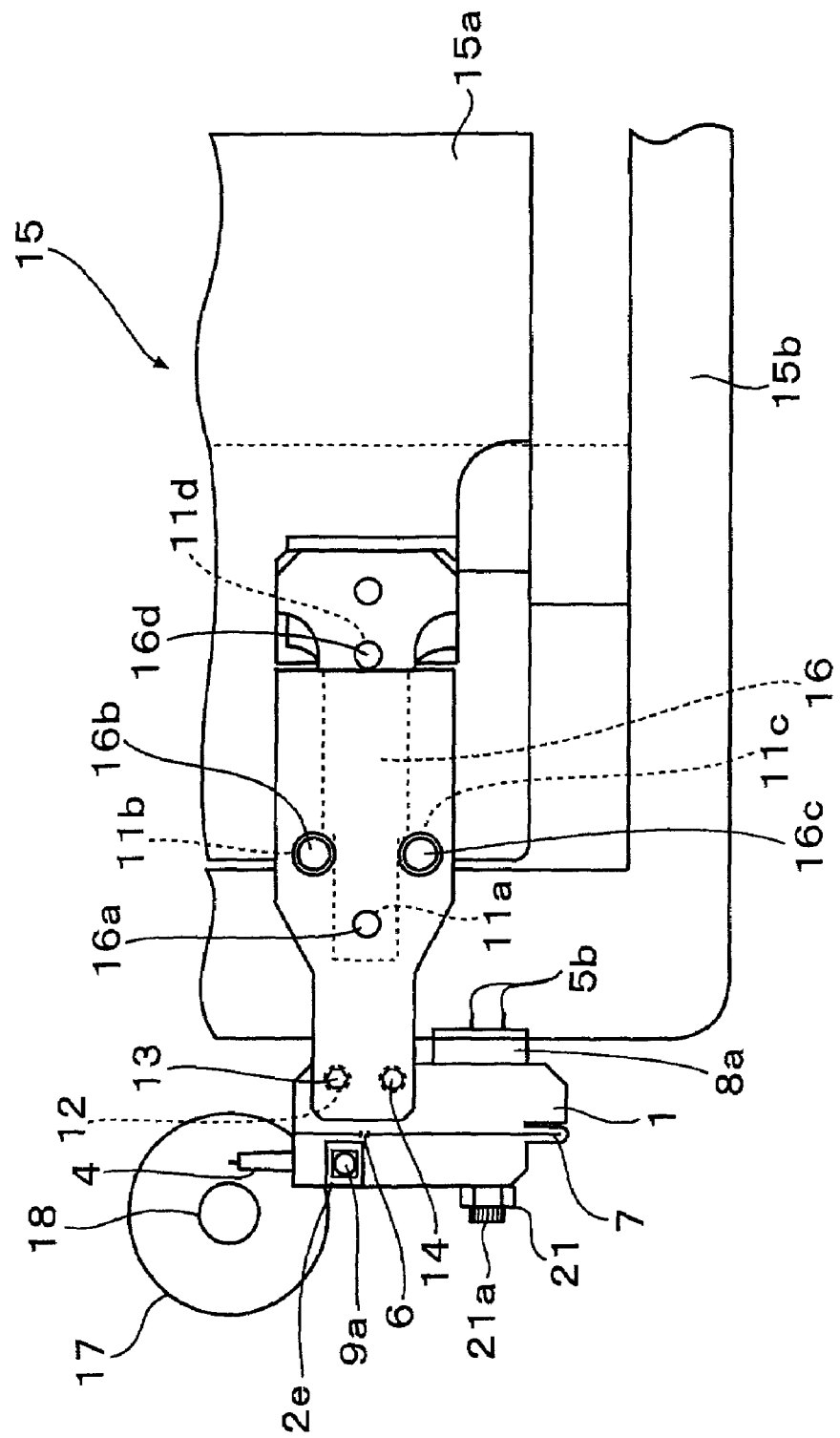
FIG. 5 shows a portion of the plan view of the head carriage in a magnetic head tester or a magnetic disk tester.

When the piezo actuator 5 is driven, the screw 21 is moved forward/backward, so that the flexible coupling portion 6 is bent clockwise/counterclockwise through the screw 21 and the head assembly fixing block 2 is finely swung in the double arrow in FIG. 2 around the coupling portion 6 as a swing center. As a result, the head assembly 4 is swung, so that the head 4a on the top end side of the head assembly 4 is finely moved dynamically in a direction crossing the track of a magnetic disk (not shown). In this case, the piezo actuator 5 is driven by power corresponding to the servo signal supplied to the terminals 5a from a drive circuit (not shown) through the lead lines 5b (FIGS. 1 and 5).

Incidentally, by extending a little bit of the leg (on the top end side) of the screw 21 by rotating the knob 21a, the coupling portion 6 is bent as shown by a dotted line 6a in FIG. 2, so that a coupling force between the vibrating surface of the piezo actuator 5 and the screw 21 and reactive force of the coupling portion 6 are increased. Therefore, it is possible to add an appropriate elastic force to the coupling portion 6 by regulation of the knob 21a. In such case, the head assembly fixing block 2 swings about the position of the bent line 6a.

The connecting portion 7 acts to support the head assembly fixing block 2 and to restore the bending of the coupling portion 6. It is not always necessary to joint the driving surface of the piezo actuator 5, which moves forward/backward, and the top end of the screw 21 when the screw 21 and the piezo actuator 5 are always in a strong contact state by, for example, considerable preliminary bending of the coupling portion 6 and the action of the connecting portion 7.

The connecting portion 7 may be provided correspondingly to the width and depth of the coupling portion 6 and the weight of the head assembly fixing block 2 and is not always necessary for the swinging of the head. Further, it is possible to fixedly couple the screw 21 to the driving surface of the piezo actuator 5 by rotating the knob 21a of the screw 21 and to regulate the head position by regulating the coupling length of the screw in the piezo actuator.

In FIG. 3 showing a side view of the head holder 10, a head clamp mechanism 9 for detachably mounting the head assembly 4 on the head holder 1 is provided on the head assembly fixing block 2. The head clamp mechanism 9 is fixedly mounted on a lower surface of the head assembly fixing block 2 by such as screws. A reference numeral 9a depicts an operation lever for fixing/releasing the head assembly with respect to the head clamp mechanism 9.

The operation lever 9a is rotatably fixed in a rectangular groove 2a, which is dug in the head assembly fixing block 2 up to the head clamp mechanism 9. The top end side of the operation lever 9a is rotatably supported by a bearing 9b provided in a bottom portion of the rectangular groove 2a and a lower protrusion 9c of the operation lever 9a, which extends from the lower side of the bearing 9b, is engaged with a curved leaf spring (not shown) and releases the energizing force of the curved leaf spring by pushing down the curved leaf spring. Therefore, an engaging block 9d is shifted rightward in the figure. When the pushing-down force of the leaf spring is released, the engaging block 9d is pulled leftward and the force of the leaf spring is added to the engaging block 9d.

Thus, when the operation lever 9a is in a dotted position, the engaging block 9d is moved rightward to reduce the pressing force of the head assembly 4, so that the head assembly 4 is released. When the operation level 9a is in the solid line, the engaging block 9d is moved leftward by the leaf spring, so that the head assembly 4 is fixed to the head clamp mechanism 9.

A new head assembly 4 (magnetic head) is mounted by positioning the operation lever 9a in the position shown by the dotted line, turning the head holder 1 to turn the head clamp mechanism 9 up side down, mounting the new head assembly 4 on the head clamp mechanism 9 and returning the operation lever 9a to the position shown by the solid line.

Thus, the head holder for which the magnetic head can easily be exchanged is realized. Particularly, the test throughput in the magnetic head tester can be improved.

Figure 4:
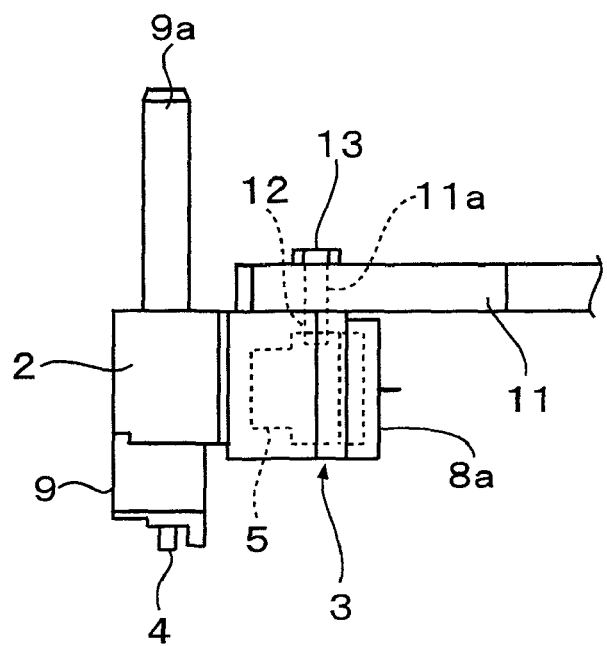
FIG. 4 is a side view in which the head holder is mounted on a support arm such as a carriage.

As shown in FIGS. 1 and 4, the support block 3 of the head holder 1 has a female screw 12 in an upper surface thereof and is fixed to a head holder support arm 11 having a head holder mounting hole 11a by screwing a mounting screw 13 into the female screws 12 through the head holder mounting hole 11a. Thus, the head holder 1 and the head holder supporting arm 11 are united. Incidentally, a positioning pin 14 (FIGS. 1 and 5) is provided in the support block 3 adjacent to the female screw 12 and fitted in a positioning guide hole when the head holder 1 and the head holder support arm 11 are united.

Thus, the head assembly 4 and the head clamp mechanism 3 on the front side of the mounting position of the mounting screw 13 of the head holder 1 and the piezo actuator 5 on the rear side thereof are arranged with good weight balance. Therefore, the head holder 1 is supported by the head holder support arm 11 with good balance, so that the positioning preciseness of the head can be improved.

In FIG. 5, a reference numeral 15 depicts a head carriage (head carriage mechanism), 15a a moving table thereof, 15b a guide frame of the table and 16 shown by a dotted line an arm mounting base provided on the moving table 15a. An arm mounting pedestal 16 includes positioning pins 16a and 16d and mounting screws 16a and 16c with which the arm mounting pedestal is bolted to the moving table 15a.

A reference numeral 17 depicts a magnetic disk to be tested and 18 a spindle.

The head holder support arm 11 has holes 11a to lid provided correspondingly to the positioning pins 16a and 16d and the mounting screws 16b and 16c. The head holder support arm 11 is mounted on the arm mounting pedestal 16 and positioned by the positioning pins 16a and 16d fitted in the corresponding holes 11a and 11d and fixed to the moving table 15a through the arm mounting pedestal 16 by the mounting screws 16b and 16c and the holes 11b and 11c.

Incidentally, the tester having this head carriage 15 may be that described in U.S. Pat. No. 7,035,039 which is incorporated herein by reference.

Incidentally, in the above described embodiment, the head clamp mechanism 9 is provided in the head assembly fixing block 2. However, in lieu of the head clamp mechanism 9, it is of course possible to fix the head assembly 4 directly to the lower surface of the head assembly fixing block 2 through such as screws. In this invention, it is not always necessary to provide the head clamp mechanism 9 in the head assembly fixing block 2.

The connecting portion 7 in this embodiment is an auxiliary support portion which may be provided correspondingly to the width and thickness (depth) of the coupling portion 6 and the weight of the head assembly fixing block on the swing side. This is enough to allow the swing operation of the head assembly fixing block 2 and the configuration thereof is not limited to the curved one.

Further, in the described embodiment, the driving surface of the piezo actuator and the head assembly fixing block are united by the screw 21. However, since the flexible coupling portion is bent and there is a recovery force thereof, it is not always necessary to unit the drive surface of the piezo actuator and the screw 21.

The invention claimed is:

1. A head assembly drive mechanism for moving a magnetic head in a direction crossing a track through a head assembly, which supports said magnetic head through a spring, comprising:
    a head holder for holding said head assembly including a first block, a second block and an actuator fixed to said first block or said second block,
    said head assembly being fixed to said first block and said first block and said second block being connected by a flexible coupling portion with a predetermined gap between them,
    said head assembly drive mechanism swinging said head assembly in such a way that said magnetic head moves in a direction crossing said track by bending said coupling portion by changing a size of said predetermined gap between said first block and said second block on either side of said coupling portion by said actuator, and
    a bent connecting portion disposed on an opposite side of said head assembly to said coupling portion, for connecting said first block and said second block together while allowing said first block to swing and to restore the size of said predetermined gap between said first block and said second block on either side of said coupling portion.

2. A head assembly drive mechanism as claimed in claim 1, wherein said coupling portion is a linear elastic member, said actuator is disposed in said second block and swings said first block with respect to said second block around said coupling portion.

3. A head assembly drive mechanism as claimed in claim 2, wherein said actuator is a piezo actuator and said head assembly and said piezo actuator are arranged in said first and second blocks on opposite sides of said coupling portion.

4. A head assembly drive mechanism as claimed in claim 3, wherein said first and second blocks are cut out from a single block with said coupling portion being left.

5. A head assembly drive mechanism as claimed in claim 4, wherein said head holder is a rectangular member formed of SUS, thicknesses of said first block, said second block and said coupling portion are in a range from 8 mm to 12 mm, respectively, width of said coupling portion is in a range from 0.8 mm to 1.5 mm and the swing angle of said coupling portion is 1° or less.

6. A head assembly drive mechanism as claimed in claim 5, further comprising a clamp mechanism disposed in said first block for detachably clamping said head assembly, wherein the swing drive angle is in a range from 0.1° to 0.3°.

7. A head assembly drive mechanism as claimed in claim 5, further comprising a screw disposed in a position opposing to the drive surface of said piezo actuator and passing through said first block, wherein said piezo actuator is disposed within said second block and a top end of said screw is connected to a driving surface of said piezo actuator.

8. A head holder for supporting a head assembly supporting a magnetic head through a spring, comprising a first block, a second block and an actuator fixed to said first block or said second block, said head assembly being fixed to said first block, said first and second blocks being connected with a predetermined gap between said first and second blocks by a flexible coupling portion, said magnetic head being moved in a direction crossing said track by changing a size of said predetermined gap between said first block and said second block on either side of said coupling portion by bending said coupling portion by said actuator, and
    a bent connecting portion disposed on an opposite side of said head assembly to said coupling portion, for connecting said first block and said second block together while allowing said first block to swing and to restore the size of said predetermined gap between said first block and said second block on either side of said coupling portion.

9. A head holder as claimed in claim 8, wherein said coupling portion is a linear elastic member and said actuator is disposed in said second block to swing said first block with respect to said second block around a position of said coupling portion.

10. A head holder as claimed in claim 9, wherein said actuator is a piezo actuator and said head assembly and said piezo actuator are arranged on opposite sides of said coupling portion.

11. A head holder as claimed in claim 10, wherein said first and second blocks are cut out from a single block with said coupling portion being left and a swing drive angle of said first block is in a range from 0.1° to 0.3°.

12. A magnetic head tester for testing a read/write characteristics of a magnetic head by controlling said magnetic head in such a way that said magnetic head becomes an ON state or a predetermined position of the track by moving said magnetic head in a direction crossing the track through a head assembly for supporting said magnetic head through a spring, comprising a head holder for holding said head assembly, a head carriage mechanism for supporting said head holder through a support arm and a spindle on which a magnetic disk is mounted, said head holder including a first block, a second block and an actuator fixed on either said first block or said second block, said head assembly being fixed to said first block, said first block and said second block being connected with a predetermined gap between said first and second blocks by a flexible coupling portion, and
    a bent connecting portion disposed on an opposite side of said head assembly to said coupling portion, for connecting said first block and said second block together while allowing said first block to swing and to restore a size of said predetermined gap between said first block and said second block on either side of said coupling portion, wherein said magnetic disk tester controls said magnetic head to make said magnetic head in the ON state by swinging said head assembly in such a way that said magnetic head moves in a direction crossing said track by bending said coupling portion by changing a size of said predetermined gap between said first block and said second block on either side of said coupling portion by said actuator.

13. A magnetic head tester as claimed in claim 12, wherein said coupling portion is a linear elastic member and said actuator is a piezo actuator disposed in said second block to swing said first block with respect to said second block around said coupling portion with respect to said second block and said head assembly and said piezo actuator are arranged on opposite sides of said coupling portion.

14. A magnetic head tester as claimed in claim 13, wherein said actuator is driven correspondingly to a servo signal set correspondingly to the track on said magnetic disk.

15. A magnetic disk tester for testing a read/write characteristics of a magnetic head by controlling said magnetic head in such a way that said magnetic head becomes in an ON state or a predetermined position of the track by moving said magnetic head in a direction crossing the track through a head assembly for supporting said magnetic head through a spring, comprising:
 a head holder for supporting said head assembly;
 a head carriage mechanism for supporting said head holder through a support arm; and
 a spindle on which a magnetic disk is mounted,
 wherein said head holder includes a first block, a second block and an actuator fixed on either said first block or said second block,
 said head assembly is fixed to said first block and said first block and said second block are connected with a predetermined gap between said first and second blocks by a flexible coupling portion,
 said magnetic disk tester controls said magnetic head to make said magnetic head in an ON state by swinging said head assembly in such a way that said magnetic head moves in a direction crossing said track by bending said coupling portion by changing a size of said predetermined gap between said first block and said second block on either side of said coupling portion by driving said actuator, and
 said first block and said second block are connected by a bent connecting portion, said bent connecting portion being disposed on an opposite side of said head assembly to said coupling portion, and allowing said first block to swing and to restore the size of said predetermined gap between said first block and said second block on either side of said coupling portion.

16. A magnetic head tester as claimed in claim 15, wherein said coupling portion is a linear elastic member and said actuator is a piezo actuator disposed in said second block to swing said first block with respect to said second block around said coupling portion and said head assembly and said piezo actuator are arranged on opposite sides of said coupling portion.

17. A magnetic head tester as claimed in claim 16, wherein said actuator is driven according to a servo signal set correspondingly to a track on said magnetic disk.

* * * * *